K. B. QUINAN.
PRODUCTION OF SULFURIC ACID.
APPLICATION FILED MAR. 25, 1919.

1,348,736.

Patented Aug. 3, 1920.
2 SHEETS—SHEET 1.

INVENTOR:
Kenneth Bingham Quinan,
BY
ATTORNEYS.

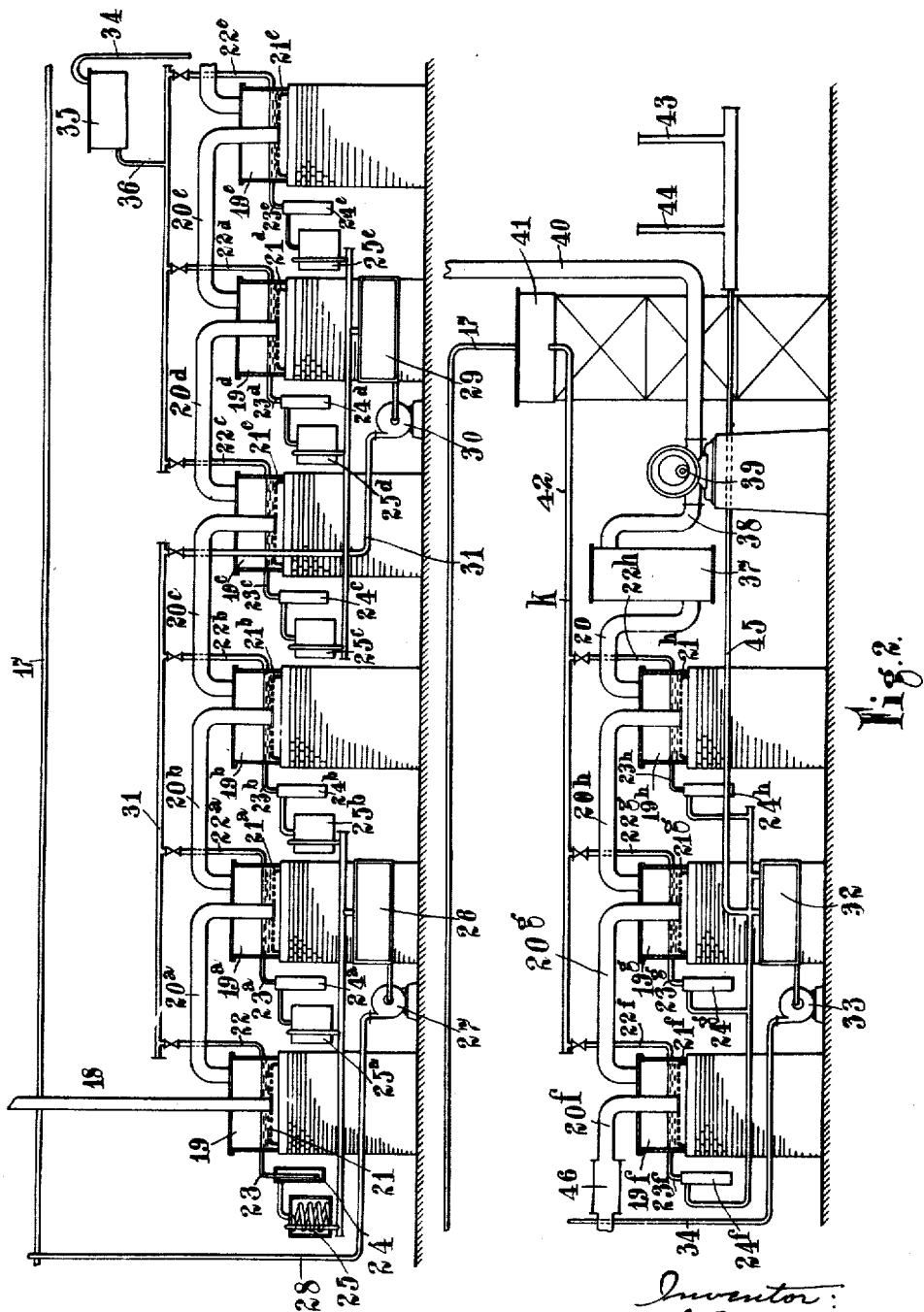

UNITED STATES PATENT OFFICE.

KENNETH BINGHAM QUINAN, OF SOMERSET WEST, CAPE PROVINCE, SOUTH AFRICA.

PRODUCTION OF SULFURIC ACID.

1,348,736.	Specification of Letters Patent.	Patented Aug. 3, 1920.

Application filed March 25, 1919. Serial No. 285,020.

*To all whom it may concern:*

Be it known that I, KENNETH BINGHAM QUINAN, a citizen of the United States of America, and residing at Somerset West, Cape Province, Union of South Africa, have invented certain new and useful Improvements in and relating to the Production of Sulfuric Acid, of which the following is a specification.

This invention relates to the process of producing sulfuric acid involving the intervention of nitric oxid.

The invention consists broadly in conducting the process as a whole or certain stages of the process by distributing the liquids entering into reaction with gases, over the surface of a permeable diaphragm so as to form a layer of liquid thereon and causing the gases entering into reaction with the liquid to pass through the layer of liquid under such conditions that substantial percolation of the liquid is prevented.

Such a diaphragm may be constituted by a plate of suitable material suitably perforated with a number of small holes, or by a grating supporting a large number of small balls or other suitably formed bodies of an acid-resisting material.

The apparatus employed may comprise a diaphragm device in which contact between liquid and gas is effected in the manner specified, a reservoir for the acid, a temperature-adjusting device and means for causing the acid to circulate repeatedly from the reservoir over the diaphragm and through the cooling device back to the reservoir.

As will be understood, the diaphragm devices may be worked in groups, a series or parallel or a series-parallel arrangement being employed, and one or more of such groups may constitute a device in which one group of reactions as for instance denitrification takes place, while other elements or groups constitute a device in which another group of reactions as for instance the oxidation of sulfur dioxid and the formation of nitrosulfonic and nitrosyl sulfuric acid takes place.

A plant adapted for use in carrying the invention into effect is illustrated by way of example in the accompanying drawings, in which:—

Fig. 2 is a view of the remaining portion of the plant.

Figure 1:
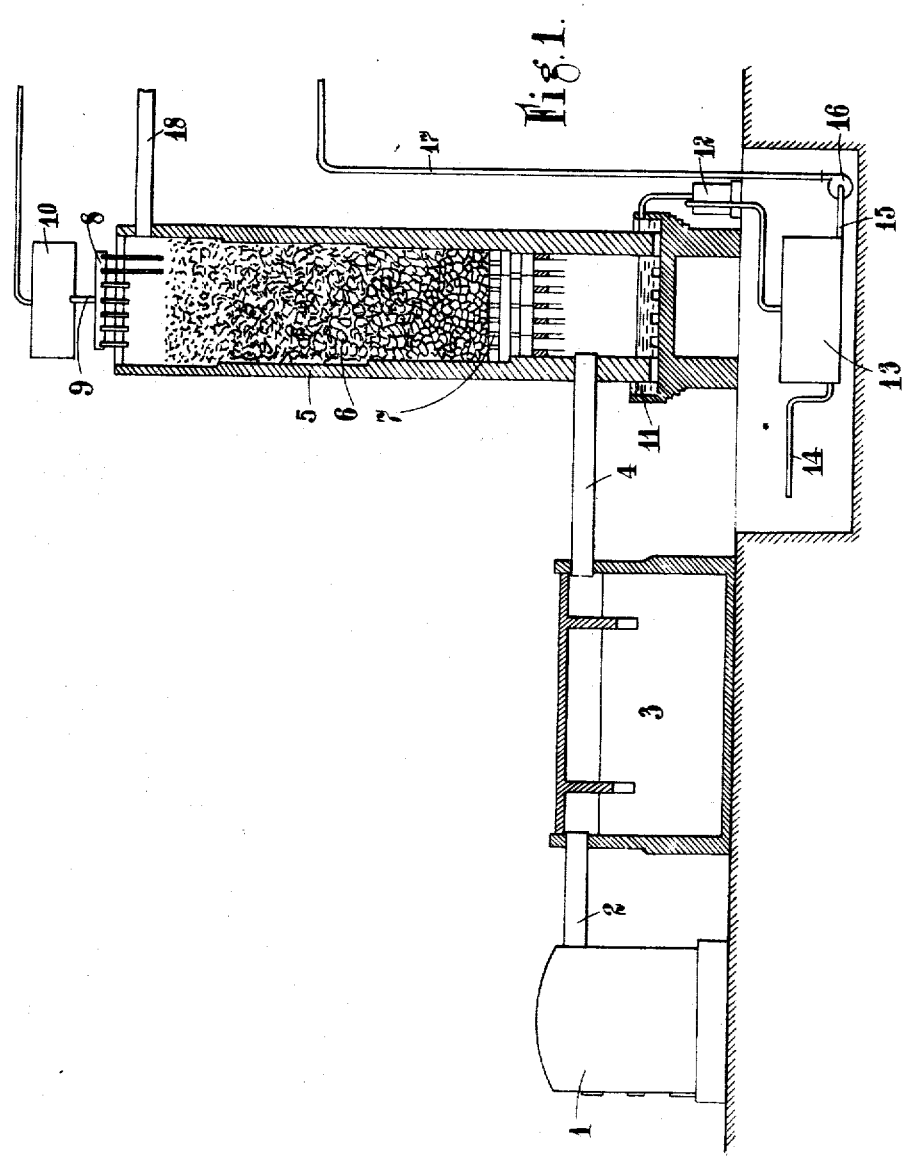
Figure 1 is an elevation partly in section of the burner, dust-separator and concentrating tower forming part of the plant.

In the drawings, 1 represents a sulfur or pyrites burner, 2 the pipe leading the gases therefrom to a dust-chamber 3, 4 the pipe leading the gases from the dust-chamber to the tower 5, provided with packing 6, supported on the grate 7, and with a distributer 8 for acid supplied thereto by the pipe 9 from the tank 10, the treated acid being collected at 11 and passed, by way of the cooler 12, to the tank 13 from which the acid may be drawn off by the pipe 14, or by the pipe 15 by means of the pump 16 which delivers the acid through the pipe 17 to a portion of the plant to be subsequently described. The gases treated in the tower pass therefrom by way of the pipe 18 to the vessel 19 and thence successively to the vessels $19^a$, $19^b$, $19^c$, $19^d$, $19^e$, $19^f$, $19^g$ and $19^h$ by way of the connections $20^a$, $20^b$, $20^c$, $20^d$, $20^e$, $20^f$, $20^g$, $20^h$. The chambers are each provided with a perforated diaphragm, indicated respectively by the references 21, $21^a$, $21^b$, $21^c$, $21^d$, $21^e$, $21^f$, $21^g$, $21^h$, below which gas is introduced by the pipe 18 in the case of the vessel 19, and by the connections $20^a$—$20^h$ respectively in the cases of the vessels $19^a$—$19^h$. Each of the vessels is provided with a liquid inlet pipe, indicated respectively by the references 22, $22^a$, $22^b$, $22^c$, $22^d$, $22^e$, $22^f$, $22^g$, $22^h$, and a liquid outlet indicated respectively by the references 23, $23^a$, $23^b$, $23^c$, $23^d$, $23^e$, $23^f$, $23^g$, $23^h$, discharging respectively into traps 24, $24^a$, $24^b$, $24^c$, $24^d$, $24^e$, $24^f$, $24^g$, $24^h$, of which the traps 24 to $24^e$ in turn are connected respectively with the coolers 25, $25^a$, $25^b$, $25^c$, $25^d$, $25^e$.

The coolers 25 to $25^b$ are arranged to discharge into the tank 26 which is connected with the pump 27 and the pipe 28 which delivers into the tank 10 above the tower 5, see Fig. 1; the coolers $25^c$, $25^d$, $25^e$, discharge into the tank 29 which is connected with the pump 30 and the pipe 31 adapted to supply liquid to the vessels 19, $19^a$ and $19^b$ respectively by way of their liquid inlets 22, $22^a$ and $22^b$.

The liquid outlets $23^f$, $23^g$, $23^h$ of the vessels $19^f$, $19^g$, $19^h$ are connected through the traps $24^f$, $24^g$, $24^h$ with the tank 32, with which the pump 33 is in connection. This pump is arranged to deliver through the pipe 34 into the tank 35 which is connected by way of the pipe 36 with the liquid inlets 22$^c$, 22$^d$ and 22$^e$ of the vessels 19$^c$, 19$^d$ and 19$^e$. The gases passing from the vessel 19$^h$ by way of the pipe 20$^k$ pass through a mist remover 37 and by way of the pipe 38 and the exhauster 39 and pipe 40 to the atmosphere. The tank 41 receives acid from the tower 5 by way of the pipe 17 and delivers this acid to the vessels 19$^f$, 19$^g$, 19$^h$, which in turn discharge into the tank 32. This tank is arranged to be supplied with nitric acid by the pipe 43 and water by way of the pipes 44 and 45. In the connection 20$^t$ an enlargement 46 is provided the purpose of which will be subsequently indicated.

The operation of the apparatus is as follows:—The gases produced by burning sulf r, pyrites, or other suitable material in 1 p ss by way of the pipe 2 into the dust-separator 3 and thence by way of the pipe 4 to the tower 5 to which acid from the chambers 19, 19$^a$, 19$^b$, constituting the section of the plant in which denitrification of the acid is effected, is supplied. The gases passing forward from the tower are in these chambers brought into intimate contact with the liquid acid from the chambers 19$^c$, 19$^d$, and 19$^e$, in which the sulfur trioxid forming reactions, as well as reactions resulting in the formation of nitro-sulfonic and nitrosyl-sulfuric acid take place, the gases more or less freed from sulfur compounds then pass to the chambers 19$^f$, 19$^g$, 19$^h$, by way of the enlargement 46 on the pipe 20$^t$ which is designed to enable the lower oxids of nitrogen contained in the gases to become oxidized at the expense of the atmospheric oxygen present to higher oxids of nitrogen. These oxids of nitrogen arise from the reactions taking place in the preceding chambers due to the introduction into the system of nitric acid by way of the pipes 43, 45, the tank 32, the pump 33, pipe 34, tank 35, pipe 36 and the respective acid inlets of the chambers 19$^c$, 19$^d$, and 19$^e$, and the higher oxids of nitrogen formed are absorbed by the acid from the tower 5, which is introduced from the tank 41 by way of the pipe 42 and the respective liquid inlets of the vessels 19$^f$, 19$^g$, and 19$^h$, with the formation of nitro-sulfonic and nitrosyl-sulfuric acid which is also collected in the tank 32 and passes forward with additional water and any nitric acid introduced in the manner indicated to compensate for losses of oxids of nitrogen accurring.

It is to be observed that the conditions under which the reactions between gases and liquids take place in these vessels are clearly distinguished from the conditions under which reactions take place in the lead chambers hitherto usually employed, where, as will be understood, the reacting materials and the reaction products form a substantially homogeneous system in the reaction zones, that is to say, in those parts of the chamber other than such as are in the immediate vicinity of the walls or floor of the chamber, and they are as clearly distinguished from the conditions obtaining in scrubbers or towers provided with packing.

While in the above detailed description the employement of a concentrating tower is referred to, it is to be understood that the provision of a Gaillard tower or other device adapted to cool the sulfur dioxid containing gases or to utilize the heat contained in them in any way falls within the scope of the present invention.

The regulation of the temperature of the absorbent and of its composition and the gas is accomplished only with difficulty in the process of producing sulfuric acid with the intervention of nitric oxid as hitherto practised. But with such a localization as is provided by this invention the optimum conditions of contact can be obtained and the regulation of the temperatures of the reacting materials and of their compositions in the several stages can be conveniently effected, so that the reactions may take place under the optimum conditions as regards temperature or composition or both.

As will be understood, the presence of a relatively small proportion of bodies which are normally liquid entrained as liquid in the gases or contained therein as vapor is unavoidable, when carrying out the process according to the invention in a practical manner. The presence in these proportions of bodies which are normally liquid is not disadvantageous, and it may be pointed out that the proportion is not in any way comparable with the proportions which are present in the gases in the lead chambers.

In conclusion it may be pointed out that it has previously been proposed to wash gases with liquids by distributing the washing liquid over a permeable diaphragm through which the gases are caused to pass under such conditions that substantial percolation of the liquid through the diaphragm is prevented.

Having now particularly described and ascertained the nature of my said invention and in what manner the same is to be performed, I declare that what I claim is:—

1. The process of producing sulfuric acid involving the intervention of nitric oxid which comprises conducting the process as a whole or certain stages of the process by distributing the liquids entering into reaction with gases, over the surface of a permeable diaphragm so as to form a layer of liquid thereon, and causing the gases entering into reaction with the liquid to pass through the layer of liquid and to support the liquid above the diaphragm.

2. In a process of producing sulfuric acid involving the intervention of nitric oxid, the steps comprising maintaining a layer of sulfuric acid above a permeable diaphragm, supplying a reactive gas mixture containing oxids of sulfur and nitrogen beneath said diaphragm, and causing said gas mixture to pass upwardly through the diaphragm and through said acid layer in sufficient volume to prevent substantial percolation of the acid, whereby reaction products produced in gaseous phase are rapidly absorbed by the acid overlying the diaphragm.

3. In a process of producing sulfuric acid involving the intervention of nitric oxid, the steps comprising establishing a transverse flow of sulfuric acid above a permeable diaphragm to form a layer of acid thereon, supplying a reactive gas mixture containing oxids of sulfur and nitrogen beneath said diaphragm, and causing said gas mixture to pass upwardly through the diaphragm and through said acid layer in sufficient volume to prevent substantial percolation of the acid, whereby reaction products produced in gaseous phase are rapidly absorbed by the acid overlying the diaphragm.

In testimony whereof I have signed my name to this specification.

KENNETH BINGHAM QUINAN.